Oct. 19, 1943.  E. H. KOCHER  2,331,984
LUBRICATION
Filed April 12, 1939  3 Sheets-Sheet 1
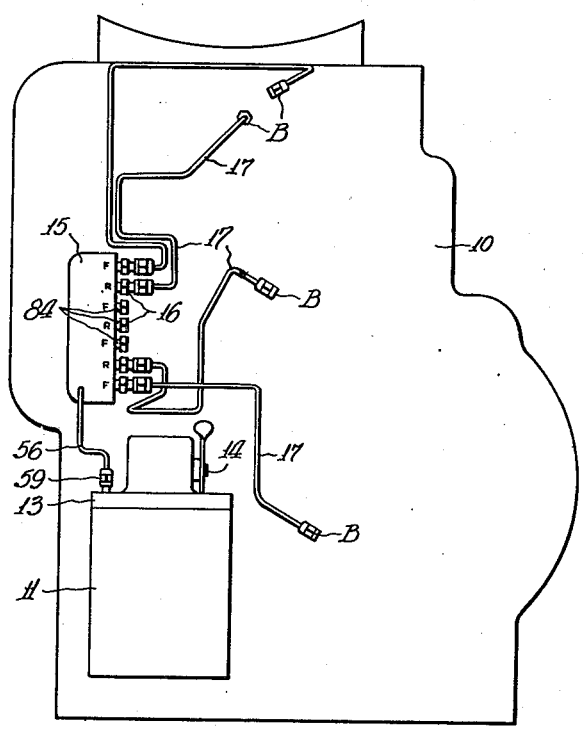
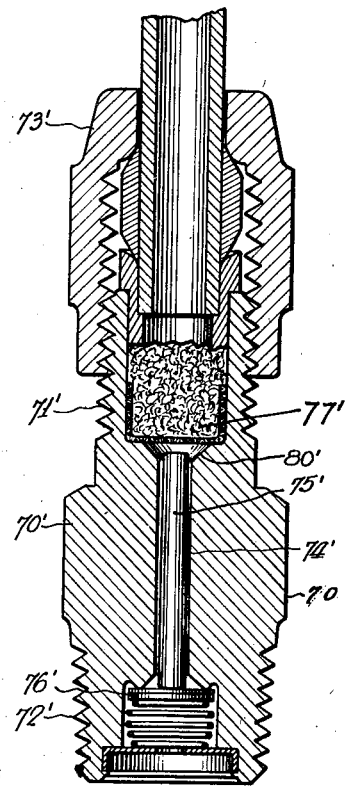
INVENTOR
Edward H. Kocher
BY
ATTORNEYS Oct. 19, 1943. E. H. KOCHER 2,331,984
LUBRICATION
Filed April 12, 1939 3 Sheets-Sheet 2
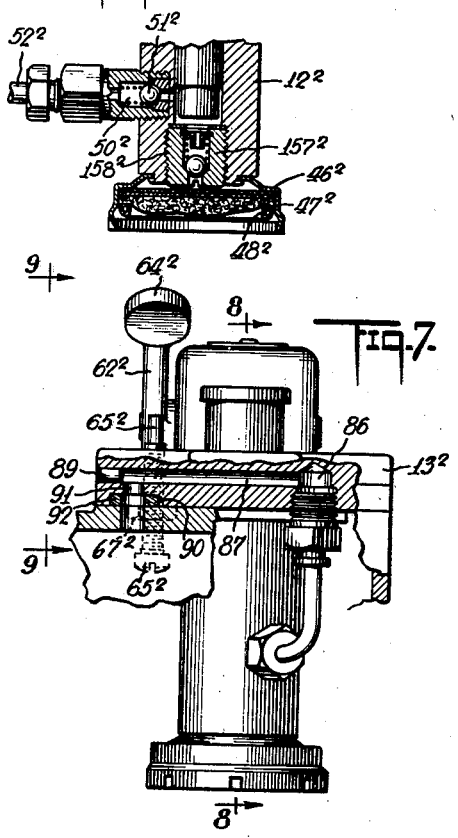
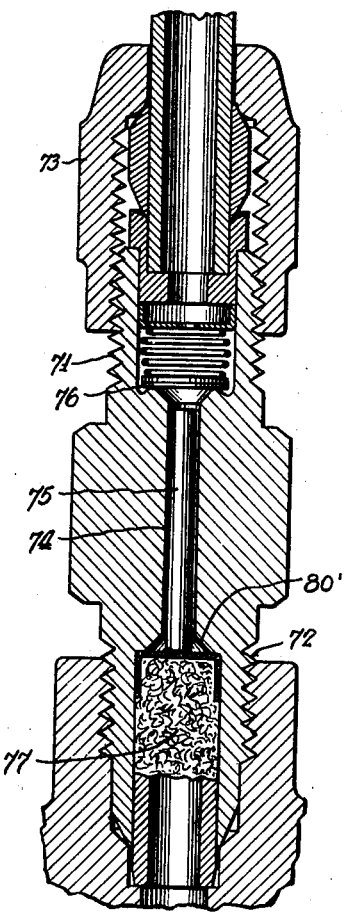
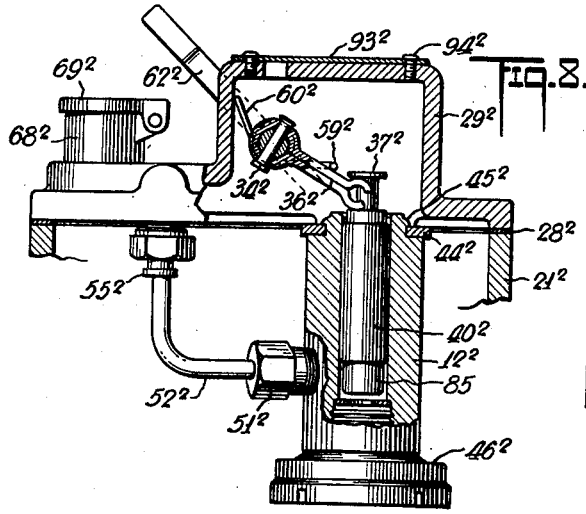
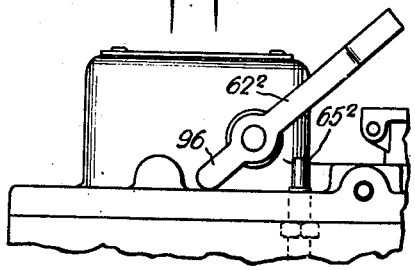
INVENTOR
Edward H. Kocher
BY
ATTORNEYS Oct. 19, 1943.  E. H. KOCHER  2,331,984
LUBRICATION
Filed April 12, 1939  3 Sheets-Sheet 3
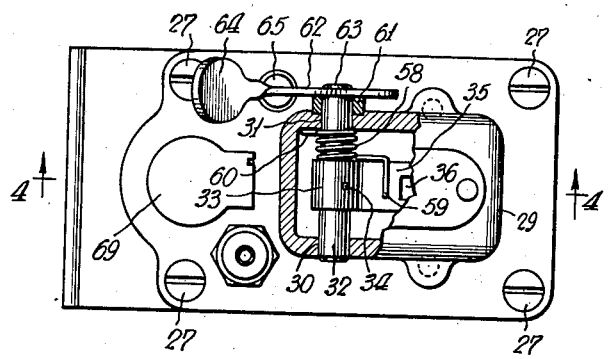
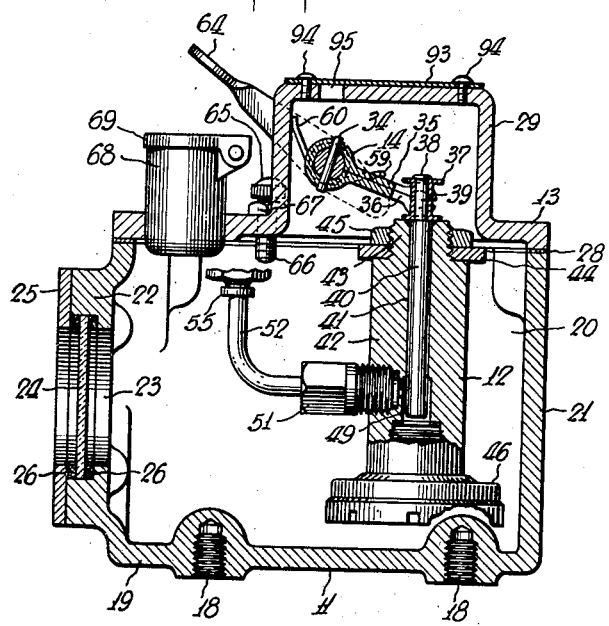
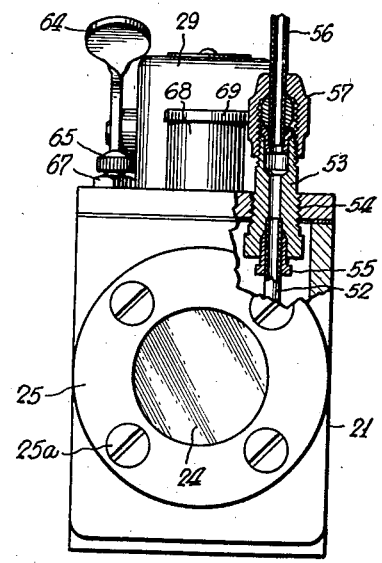
INVENTOR
Edward H. Kocher
BY
ATTORNEYS Patented Oct. 19, 1943

2,331,984

UNITED STATES PATENT OFFICE 2,331,984

LUBRICATION

Edward H. Kocher, Boonton, N. J., assignor to Auto Research Corporation, a corporation of Delaware Application April 12, 1939, Serial No. 267,372

11 Claims. (Cl. 184—7)

The present invention relates to a centralized lubricating system and it particularly relates to a pressure unit for such a system.

In many types of apparatus, such as moving picture projectors, it is desirable to lubricate the various bearings thereof at relatively infrequent intervals with relatively small amounts of lubricant, with assurance that the lubrication will not spill over or tend to run over the exterior of the apparatus where it might tend to come in contact with the film and stain it and cause difficulty both in projection or in sound reproduction and also resultant deterioration of the film, lessening its life and preventing reuse thereof.

Upon manual lubrication of the bearings around or in a moving picture projector, whether it be for amateur film of 8 or 16 millimeters in width or professional film of 35 millimeters in width, the amount of lubricant is frequently in excess, causing drippage into the exterior of the machine where lubricant causes injury to the relatively expensive film and also may obstruct the lenses or light conduits within the projector.

Moreover because of the high heat generated by the illuminating devices in the casings of the ordinary moving picture projector, excess lubricant often tends to gum or become charred, and also results in a collection of dirt and dust with resultant increased fire hazards.

It is not readily possible to include a lubricating installation within the ordinary projector because of the limited space available and it is among the objects of the present invention to provide a compact small lubricating pump and installation which will enable satisfactory lubrication of the bearings of a projector of the character above described, in which assurance will be had that only such amounts of lubricant will be fed to the bearings as will be consumed without any liability of overflow tending to form gummy deposits or other undesirable accretions within the interior of the casing.

Another object is to provide a compact small volume pump for centralized lubricating systems, which may be manually actuated to feed predetermined quantities of lubricant in small quantities to a plurality of outlets to the bearings of a mechanism with assurance that excess quantities of lubricant will not be supplied at any time.

Other objects will be obvious or will appear during the course of the following specification.

In accomplishing the above objects it has been found most suitable to provide a relatively small casing forming the reservoir in which is mounted an elongated metallic body, as for example of hexagonal brass or copper stock, which is centrally bored to receive a long close-fitting, unpacked plunger.

The cylinder occupies substantially the full height of the reservoir and projects above the lubricant level into a hood at the top of the reservoir.

The piston also projects out into the hood and it is provided with a sleeve or collar at its upper end, by which it may be actuated and reciprocated.

In one form, the top of the piston is connected to an arm which is pivotally mounted on a shaft extending transversely through the hood or box on the top of the reservoir. The shaft carries a manual actuator member, by which the piston may be reciprocated. The small reservoir pump combination may be conveniently mounted upon the outside of a moving picture projector or other mechanism or even inside of such mechanism.

In the drawings which show several of the various possible embodiments according to the present invention, to which the invention is by no means restricted, since many alternatives and changes might be made all within the scope of the present invention, the drawings merely being by way of illustration:

Fig. 1 is a layout of a machine with the pump of the present application attached thereto and illustrating how the lubricating installation may be associated therewith, Figs. 2 and 2a are longitudinal sectional views of flow control outlet fittings which may be utilized in the junctions with tail pipes extending to the bearings, Figs. 2 and 2a being in longitudinal section and upon a much larger scale than Fig. 1, Figs. 3, 4, 4a and 5 are respectively top, side sectional, fragmentary sectional, and end elevational views of the pump upon an enlarged scale as compared to Fig. 1, Fig. 6 is a diagrammatic view showing a special junction construction which may be employed from which lubricant may be distributed to the bearings of the machine, Figs. 7, 8 and 9 show an alternative construction, Fig. 7 being a side elevational view with most of the cover and reservoir structure being broken away, Fig. 8 being a side sectional view showing the pump structure upon the line 8—8 of Fig. 7 and Fig. 9 being a side view of the upper portion of the structure upon the line 9—9 of Fig. 7, Figs. 10 and 11 illustrate an alternative pump construction, Fig. 10 being an end view upon the line 10—10 of Fig. 11 and Fig. 11 being a transverse sectional view upon the line 11—11 of Fig. 10.

Referring to Fig. 1, the structure 10 may consist of a moving picture projector, but it is obvious that other mechanisms may be lubricated by the installation of the present invention. Upon the outside of the projector is mounted the reservoir 11 including the pump 12 (see also Fig. 4), the cover 13 carrying the actuating mechanism 14.

The pump feeds the distributing junction 15 having the outlets 16 to the piping system 17. The piping system 17 leads to the bearings B, which may be accessible from the exterior of the casing 10 or only accessible at the interior of the casing 10.

The usual type of bearings to be lubricated are the shaft bearings for the electric motor, the various bearings for the sprocket shafts, which feed the film, the bearings which carry the reels and the various reduction gear bearings in and about the mechanism.

With other mechanisms, of course, other groups of bearings would be lubricated, but in the case of moving picture projectors, it is important that these bearings be lubricated with relatively minute quantities of lubricant after each reel of moving picture film has been run through the projection and sound reproduction apparatus. For this reason the actuating mechanism 14 is preferably placed so that it will be operated each time the reels are changed.

Referring to the pump and reservoir construction best shown in Figs. 3 to 5, the reservoir casing 11 may consist of a casting provided with bosses 18 on the bottom 19 or in the sides 20 or 21.

The end 22 of the reservoir is preferably provided with an opening 23. In the opening 23 is positioned a round glass 24 held in position by the collar 25 and the gaskets 26. The cover 13 of the reservoir is held down by the corner screws 27 (see Fig. 3) compressing the gasket 28 (see Fig. 4) in position to form a lubricant-tight connection.

The cover is provided with an upstanding hood 29, the sides of which are bored at 30 and 31 to form bearings for the shaft 32. Upon the shaft 32 is positioned a collar 33, which is fixed to the shaft by the pin 34.

The collar 33 has the extensions 35 which contact each other and are slotted at 36 to receive the flange sleeve 37. The flanged sleeve 37 is held by the expanded portion 38 on the top of the reduced piston section 39 at the end of the elongated unpacked plunger 40.

The plunger, as indicated, is received in the bore 41 in the hexagonal or cylindrical stock 42, which forms the cylinder. The top of the stock 42 is reduced and threaded, as indicated at 43, and is mounted upon a bracket 44 by the nut 45. This bracket 44 is connected to the interior of the reservoir 11.

The outlet spring seated check valve unit 51 connects to an outlet pipe 52, which passes upwardly through the reservoir and, as best shown in Fig. 5, is connected to the outlet fitting 53 by the drive sleeve 55. The drive sleeve 55 may be of the construction shown in the copending application Serial No. 727,720, filed May 26, 1934, since patented as Patent No. 2,134,719 on November 1, 1938. The outlet connection 53 is screwed into the cover 13 at 54.

The outlet pipe 56 is provided with a tapered coupling connection 57, which may be of the construction more fully described and illustrated in Patent 1,998,439, issued April 23, 1935 or application Serial No. 727,719, filed May 26, 1934, since patented under Patent No. 2,182,811 on December 12, 1939.

The shaft 32 also carries the spring 58, one end of which is turned at 59 to abut the plates 35 and the other end of which is turned at 60 to abut the inside wall of the hood 29.

The end of the shaft element 31 is provided with the washer 61, against which abuts the handle member 62, the enlarged portion 63 of the shaft 32 holding said handle member 62 in position. The handle member may consist of a plate which is turned over at 90° at 64 to form a convenient portion for manual actuation.

The adjustable stop screw 65 has a shank 66 extending through the cover 13 and a lock nut 67 fixing said screw in any desired portion. The head of the screw acts as a stop limiting downward movement of the lever 62 and limiting the upward stroke of the plunger 40. The downward stroke of the plunger is limited by abutment of the collar 37 and the top of the stock or cylinder member 42.

The cover 13 also carries the filler cylinder 68 provided with the snap cover 69 through which the reservoir 11 may be filled when the lubricant requires replenishment, as can be determined through the sight glass 24.

The junction 15, which receives lubricant from the reservoir outlet pipe 56, may be of the construction shown and described in Patents 1,929,434; 1,903,819; 2,005,766 or application Serial No. 123,384, filed February 1, 1937, since patented as Patent No. 2,229,655 on January 28, 1941.

Where the flow metering outlet fittings, which control the proportionment of lubricant to the bearings, are positioned at or adjacent the junctions 15, they may be of the construction illustrated in Fig. 2 and where they are positioned directly at the bearings, they may be of the construction illustrated in Fig. 2a.

These flow metering outlet fittings, such as illustrated in Figs. 2 and 2a, are more fully shown and described in Patents 1,632,771; 1,632,772; and in application Serial No. 226,414 filed August 24, 1938.

However, referring to Figs. 2 and 2a, they consist of bodies 70 and 70' of brass having threaded end portions 71, 71', 72 and 72'. One of said threaded end portions is provided with a coupling connection 73 which may be identical to that already described in connection with 57.

The bodies 70, 70' are provided with central bores 74, 74' having pins 75, 75' closely fitting therein.

The pins form small elongated crevices of the order of one or several thousandths of an inch, which afford a restricting effect tremendously higher than encountered in the piping or the bearings so that these outlets will in themselves control the proportionment of lubricant distributed from the tubing system and will exert sufficient obstruction to build up a substantial distributing pressure even with a single stroke of the plunger 40.

The spring seated outlet valves 76, 76' may be provided with floating valves devoid of springs as indicated in Patent 1,993,732.

As indicated, the flow metering outlet fitting is provided with inlet strainers 77, 77'.

As indicated in Fig. 1 there are a plurality of tail pipes or pressure pipes 17 which lead to the various bearings indicated at B in and about the mechanism shown in Fig. 1.

The junction 15, as shown, has seven outlets at one side thereof, but if desired, it might be replaced by a junction, such as indicated at 81 in Fig. 6, having a bracket 82 with an opening 83 to receive the bolt and a similar number of outlets, which are arranged on the face of the junction.

In the showing of Fig. 2, the outlets 84 not in use are shown as blocked by removable plugs.

Ordinarily most pumps of this character will only have to feed between four and ten bearings.

In Figs. 7, 8 and 9 is shown an alternative construction (similarly functioning parts being indicated by the same numerals having a superior 2) in which a larger plunger $40^2$ is employed. This plunger is provided with the reduced end portion 85 and the cylinder $42^2$ is held in position by being peaned at $45^2$ upon the bracket member $44^2$.

The adjusting screw $65^2$ in this case has its filister head inside of the reservoir so that it may be adjusted by removing the cover $13^2$. The lock nut $67^2$ abuts the inside face of the reservoir cover $13^2$.

In the construction as shown in Figs. 8 and 9 the outlet connection $52^2$ terminates inside of the cover $13^2$ in a socket 86 which feeds a bore 87 extending across the cover $13^2$, which is plugged at 89.

There is an outlet socket 90 which communicates with the bore 87 by the connection 91, with the inserted gasket 92 forming a lubricant-tight connection through which lubricant may be fed from the cover to an internal bore system in the mechanism.

This internal bore system may be utilized in addition to or in lieu of the external tubing system, as shown in Fig. 1.

As indicated in Figs. 3 to 5 and also in Figs. 8 and 9, the top of the hood 29 is preferably provided with a plate 93 held in position by the screws 94 covering the slot 95 permitting access to the actuating mechanism 14.

In the construction of Figs. 8 and 9 the stroke is limited by abutment of the end portion 96 of the handle $62^2$ against the top of the cover $13^2$.

Although many different sizes may be employed in the construction illustrated in Figs. 3 to 5, it has been found convenient to make the reservoir about 4 inches in length, 2 inches in width and about 2¾ inches in height. The piston may be made of $\frac{7}{16}$ inch in diameter and its stroke may range between ⅛ and ¾ inch, depending upon the adjustment.

In the construction as shown in Figs. 8 and 9, the piston may vary from ⅛ to ½ inch in diameter and have a stroke varying from ⅛ to 1 inch, giving a variation of some 1 to 100 drops of oil per discharge. The height of the stock forming the cylinder may conveniently vary from 1¼ to 3 inches.

A particular advantage of the present invention resides in the fact that the device only requires the pressing of the levers 62 and $62^2$ to lubricate the bearings and it does not necessitate that the operator at any time handle any oil can or other lubricant dispensing device. This is particularly important because of the damage caused to moving picture film by oil stains and spots, which frequently arise due to the operators handling the film. Because of this danger of staining the film with oil, which arises when the operator has oil on his hands, the result has been that the lubrication of most moving picture projectors has been neglected and this means a short life period because of being seized or worn bearings.

With the equipment of the present invention on the other hand, there is no danger that the operator will come in contact with the oil and there is little danger that the film will be stained. Moreover, the reservoir as shown will ordinarily be sufficient to take care of lubricating the projector during regular operation for a period of from three to six months between cleanings, and even in this case the reservoir may be filled by a service man and need not be filled by the operator.

Another important feature of the present invention resides in the provision of the window 24, which enables such service man immediately to determine whether the oil needs replenishment, said window being conveniently held upon the reservoir in such a manner as not to increase the bulk thereof.

In the construction also the provision of a junction flow metering device as shown in Fig. 2 in combination with the junctions of Figs. 1 and 6 is preferred. Nevertheless, it is also possible to use flow metering devices of the type of Fig. 2a directly at the bearings, although the former arrangement gives greater compactness.

Referring to Figs. 10 and 11, in which similarly functioning parts to those shown in Figs. 1 to 9 are referred to by the same numerals provided with a superior 3.

In Figs. 10 and 11 the cover element $13^3$ may be connected to a reservoir in the manner shown in Figs. 4 and 8, the cylinder body $12^3$ is shouldered at 150 to abut the projecting portion $44^3$ of the cover $13^3$ and the upper portion of the cylinder body $12^3$ is threaded as indicated at $43^3$. The threaded portion $43^3$ receives the cap member $45^3$, the lower end 151 of which abuts the portion 152 of the cover $13^3$.

The top of the dome element $45^3$ is provided with a bore $31^3$, through which extends the connecting rod $32^3$ having the handle actuator member $64^3$.

The opening 153 in the handle member enables a pin to be inserted to hold the piston from turning while tightening or loosening the operating knob $64^3$. The piston member $40^3$ has a lower portion 154 of reduced diameter.

The shoulder 155 of the piston receives the coil spring $58^3$, which reacts with its other end against the bottom 156 of the dome $45^3$.

The inlet check valve member $157^3$ contains a spring seated ball check of the type as shown in Fig. 4a.

As shown in Fig. 4a, the check valve member $157^2$ is screwed into a tapped recess $158^2$ in the bottom of the pump body $12^2$ and said member $157^2$ receives a spring seated ball check.

Below the spring seated ball check 157 is the filter cup $46^2$, which receives the strainer pad $47^2$, which is held in place by the snap ring $48^2$.

As shown in Fig. 11, the ball check element $157^3$ is threaded into the tapped socket $158^3$. The ball check combination $157^3$ has an extension 159 which presses against the washer 160, which in turn abuts the lower portion $85^3$ of the piston $40^3$ limiting its downward movement under the force of the spring $58^3$.

The bottom of the piston body $12^3$ is provided with a groove 161 which receives the inturned portions 162 of the annular cap 163, said cap retaining the filter or strainer member 164 in position against the bottom of the body 12³.

The side of the body 12³ receives the outlet check valve member 51³ of the same construction as shown for example in Fig. 4a. The outlet pipe 52³ is connected to the cover nipple 53³ by the coupling 55³.

The outlet bores 86³ and 87³ in the cover 13³ extend into a socket 165 which may be connected to an outside distributing system, such as the pipe or tubing 56 in Figs. 1, 5 and 6, which in the embodiment of Figs. 10 and 11 is shown blocked off by the nut 166. As shown the cover 13³ is provided with a recess 90³ receiving the washer 92³ which feeds an internal bore system on the particular mechanism to which the device may be attached.

It will be noted by reference to Figs. 10 and 11 that a particularly compact construction is obtained, and although the dimensions may be widely varied, a very effective pumping construction may be obtained in dimensions of $2\frac{13}{16}'' \times 1\frac{3}{8}'' \times 3\frac{13}{16}''$.

The piston may have a diameter in the structure as shown of ⅜ to ½ inch, while the cylinder may have a dimension of $\frac{13}{16}$ inch. These dimensions, of course, may be widely varied.

The piston may have a stroke of ⅝ inch, with a maximum discharge per stroke of about 1 to 2 cc. equivalent to about 30 to 60 drops.

It has been found that the spring 58³ may be satisfactorily adjusted to give a discharge pressure of about 30 pounds per square inch. The reservoir may have the same dimensions as the cover 13³. The stroke of the piston may be varied by adjusting the inlet check ball housing 157³ so as to change the end position of the piston.

Referring specifically to Fig. 5, the pump body is shown with the sight glass 24 held in position by the ring 25, with the manually actuated lever 64 and with the pipe outlet tubing 56. The sight glass will indicate the need for refilling the reservoir.

The inlet 68 and the adjustment 65 are readily accessible from the outside of the machine. The tube 56 leads to a junction 15 such as shown in Fig. 1, from which the oil is distributed by pipes leading to connections of the type shown in Figs. 2 and 2a.

The lubricating pump when operated, will discharge about $\frac{1}{70}$ cc. of oil through the tubing system, developing about 30 lbs. per square inch pressure.

As many changes could be made in the above construction, and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A small, compact box-like reciprocating unpacked elongated plunger pump construction for supplying relatively small quantities of lubricant intermittently upon manual application to a centralized lubricating installation including a branch distributing small bore conduit system leading to a plurality of distributed and spaced bearings to receive relatively minute, yet accurately proportioned quantities of lubricant of the total charge or lubricant supplied to said installation upon each manual operation of said pump construction, said installation including a plurality of high restriction flow metering fittings having a tremendously greater restricting effect than the small bore conduits or the bearings to be lubricated, whereby in themselves they will predominantly control the proportionment and distribution of the charge of lubricant supplied to said installation upon actuation of said pump construction; said pump construction comprising a casing forming a reservoir, the top of which is open, a cover for said casing, a hood in the central part of said cover, a vertically elongated body which is centrally vertically bored to form a cylinder element depending into said reservoir and terminating in said hood, a horizontal shaft having bearings in the sides of said hood, a plunger fitting into said cylinder, a connection between said shaft and plunger and means to reciprocate said shaft.

2. A small, compact box-like reciprocating unpacked elongated plunger pump construction for supplying relatively small quantities of lubricant intermittently upon manual application to a centralized lubricating installation including a branch distributing small bore conduit system leading to a plurality of distributed and spaced bearings to receive relatively minute, yet accurately proportioned quantities of lubricant of the total charge or lubricant supplied to said installation upon each manual operation of said pump construction, said installation including a plurality of high restriction flow metering fittings having a tremendously greater restricting effect than the small bore conduits or the bearings to be lubricated, whereby in themselves they will predominantly control the proportionment and distribution of the charge of lubricant supplied to said installation upon actuation of said pump construction; said pump construction comprising a casing forming a reservoir, the top of which is open, a cover for said casing, a hood in the central part of said cover, a vertically elongated body which is centrally vertically bored to form a cylinder element depending into said reservoir and terminating in said hood, a horizontal shaft having bearings in the sides of said hood, a plunger fitting into said cylinder, a connection between said shaft and plunger and means to reciprocate said shaft, said means including a short lever on the outside of said hood and positioned on said cover, said lever normally projecting upwardly at an angle away from said pump construction and to the side and beyond said hood and upon being pressed down toward said pump construction by the hand of an operator causing said plunger to take a charging stroke and a coil spring upon said shaft stressed upon said charging stroke, causing a return stroke of said plunger as soon as said lever is released.

3. A small, compact box-like reciprocating unpacked elongated plunger pump construction for supplying relatively small quantities of lubricant intermittently upon manual application to a centralized lubricating installation including a branch distributing small bore conduit system leading to a plurality of distributed and spaced bearings to receive relatively minute, yet accurately proportioned quantities of lubricant of the total charge or lubricant supplied to said installation upon each manual operation of said pump construction, said installation including a plurality of high restriction flow metering fittings having a tremendously greater restricting effect than the small bore conduits or the bearings to be lubricated, whereby in themselves they will predominantly control the proportionment and distribution of the charge of lubricant supplied to said installation upon actuation of said pump construction; said pump construction comprising a casing forming a reservoir, the top of which is open, a cover for said casing, a hood in the central part of said cover, a vertically elongated body which is centrally vertically bored to form a cylinder element depending into said reservoir and terminating in said hood, a horizontal shaft having bearings in the sides of said hood, a plunger fitting into said cylinder, a connection between said shaft and plunger and means to reciprocate said shaft, said means including a short lever on the outside of said hood and positioned on said cover and provided with adjustable means to limit said reciprocation, said lever normally projecting upwardly at an angle away from said pump construction and to the side and beyond said hood and upon being pressed down toward said pump construction by the hand of an operator causing said plunger to take a charging stroke and a coil spring upon said shaft stressed upon said charging stroke, causing a return stroke of said plunger as soon as said lever is released.

4. The construction of claim 3 in which said adjustable means is a screw fitting into said cover.

5. A small, compact box-like reciprocating unpacked elongated plunger pump construction for supplying relatively small quantities of lubricant intermittently upon manual application to a centralized lubricating installation including a branch distributing small bore conduit system leading to a plurality of distributed and spaced bearings to receive relatively minute, yet accurately proportioned quantities of lubricant of the total charge or lubricant supplied to said installation upon each manual operation of said pump construction, said installation including a plurality of high restriction flow metering fittings having a tremendously greater restricting effect than the small bore conduits or the bearings to be lubricated, whereby in themselves they will predominantly control the proportionment and distribution of the charge of lubricant supplied to said installation upon actuation of said pump construction; said pump construction comprising a casing forming a reservoir, the top of which is open, a cover for said casing, a hood in the central part of said cover, a vertically elongated body which is centrally vertically bored to form a cylinder element depending into said reservoir and terminating in said hood, a horizontal shaft having bearings in the sides of said hood, a plunger fitting into said cylinder, said plunger having a reduced upper end portion immediately above the cylinder, a lever between said shaft and said reduced upper end portion and means to reciprocate said shaft, said lever normally projecting upwardly at an angle away from said pump construction and to the side and beyond said hood and upon being pressed down toward said pump construction by the hand of an operator causing said plunger to take a charging stroke and a coil spring upon said shaft stressed upon said charging stroke, causing a return stroke of said plunger as soon as said lever is released.

6. A small, compact box-like reciprocating unpacked elongated plunger pump construction for supplying relatively small quantities of lubricant intermittently upon manual application to a centralized lubricating installation including a branch distributing small bore conduit system leading to a plurality of distributed and spaced bearings to receive relatively minute, yet accurately proportioned quantities of lubricant of the total charge or lubricant supplied to said installation upon each manual operation of said pump construction, said installation including a plurality of high restriction flow metering fittings having a tremendously greater restricting effect than the small bore conduits or the bearings to be lubricated, whereby in themselves they will predominantly control the proportionment and distribution of the charge of lubricant supplied to said installation upon actuation of said pump construction; said pump construction comprising a casing forming a reservoir, the top of which is open, a cover for said casing, a hood in the central part of said cover, a vertically elongated body which is centrally vertically bored to form a cylinder element depending into said reservoir and terminating in said hood, a horizontal shaft having bearings in the sides of said hood, a plunger fitting into said cylinder, said plunger having a reduced upper end portion immediately above the cylinder, a lever between said shaft and said reduced upper end portion, said lever consisting of a collar gripping said shaft and outwardly extending arms engaging said reduced upper end portion and means to reciprocate said shaft, said lever normally projecting upwardly at an angle away from said pump construction and to the side and beyond said hood and upon being pressed down toward said pump construction by the hand of an operator causing said plunger to take a charging stroke and a coil spring upon said shaft stressed upon said charging stroke, causing a return stroke of said plunger as soon as said lever is released.

7. In a lubricating installation for the bearings of a motion picture machine of the type comprising a junction mounted on the outside of the machine, a tubing line feeding to said junction, said junction having a plurality of outlet sockets, high restriction flow metering fittings fitted into said sockets, and a plurality of tail pipes leading to said bearings, a pump feeding said tubing line including a cover, a dome on said cover, a reservoir covered by said cover, a bored vertical cylinder body, an elongated unpacked piston in said bore and actuating means carried in said dome.

8. In a lubricating installation for the bearings of a motion picture machine of the type comprising a junction mounted on the outside of the machine, a tubing line feeding to said junction, said junction having a plurality of outlet sockets, high restriction flow metering fittings fitted into said sockets, and a plurality of tail pipes leading to said bearings, a pump feeding said tubing line including a cover, a dome on said cover, a reservoir covered by said cover, a bored vertical cylinder body, an elongated unpacked piston in said bore and actuating means carried in said dome, said actuating means including a bell crank lever pivotally mounted in the sides of said dome.

9. In a lubricating installation for the bearings of a motion picture machine of the type comprising a junction mounted on the outside of the machine, a tubing line feeding to said junction, said junction having a plurality of outlet sockets, high restriction flow metering fittings fitted into said sockets, and a plurality of tail pipes leading to said bearings, a pump feeding said tubing line including a cover, a dome on said cover, a reservoir covered by said cover, a bored vertical cylinder body, an elongated unpacked piston in said bore and actuating means carried in said dome, said actuating means including a lever connected at one end to said piston inside of said dome, another lever positioned at the outside of the dome and a connecting rod pivotally mounted in said dome.

10. In a lubricating installation for the bearings of a motion picture machine of the type comprising a junction mounted on the outside of the machine, a tubing line feeding to said junction, said junction having a plurality of outlet sockets, high restriction flow metering fittings fitted into said sockets, and a plurality of tail pipes leading to said bearings; a compact pump feeding said tubing line including a cover, a dome on the central part of said cover, a rectangular reservoir covered by said cover, a centrally and vertically bored vertically elongated cylinder body, an elongated unpacked piston in said bore, said cylinder body extending upwardly into the lower portion of said dome and downwardly to the bottom of said reservoir, and said piston substantially completely filling said central vertical bore of said body and extending above said body into said dome and reciprocatory manual actuating means carried by said cover including a lever positioned outside of said dome and a horizontal bracket located at the bottom of said dome carrying the top of said body, said bracket being attached to said reservoir adjacent the sides of said dome.

11. The installation of claim 10, in which said lever projects upwardly and outwardly over the cover from the side of said dome and may be pressed downwardly by the hand of the operator of the motion picture machine to cause the piston to take a charging stroke, a horizontal shank operated by said lever, extending through and bearing in the side walls of said dome, a coil spring encircling said horizontal shaft and causing a return discharge stroke of said piston.

EDWARD H. KOCHER.